UNITED STATES PATENT OFFICE.

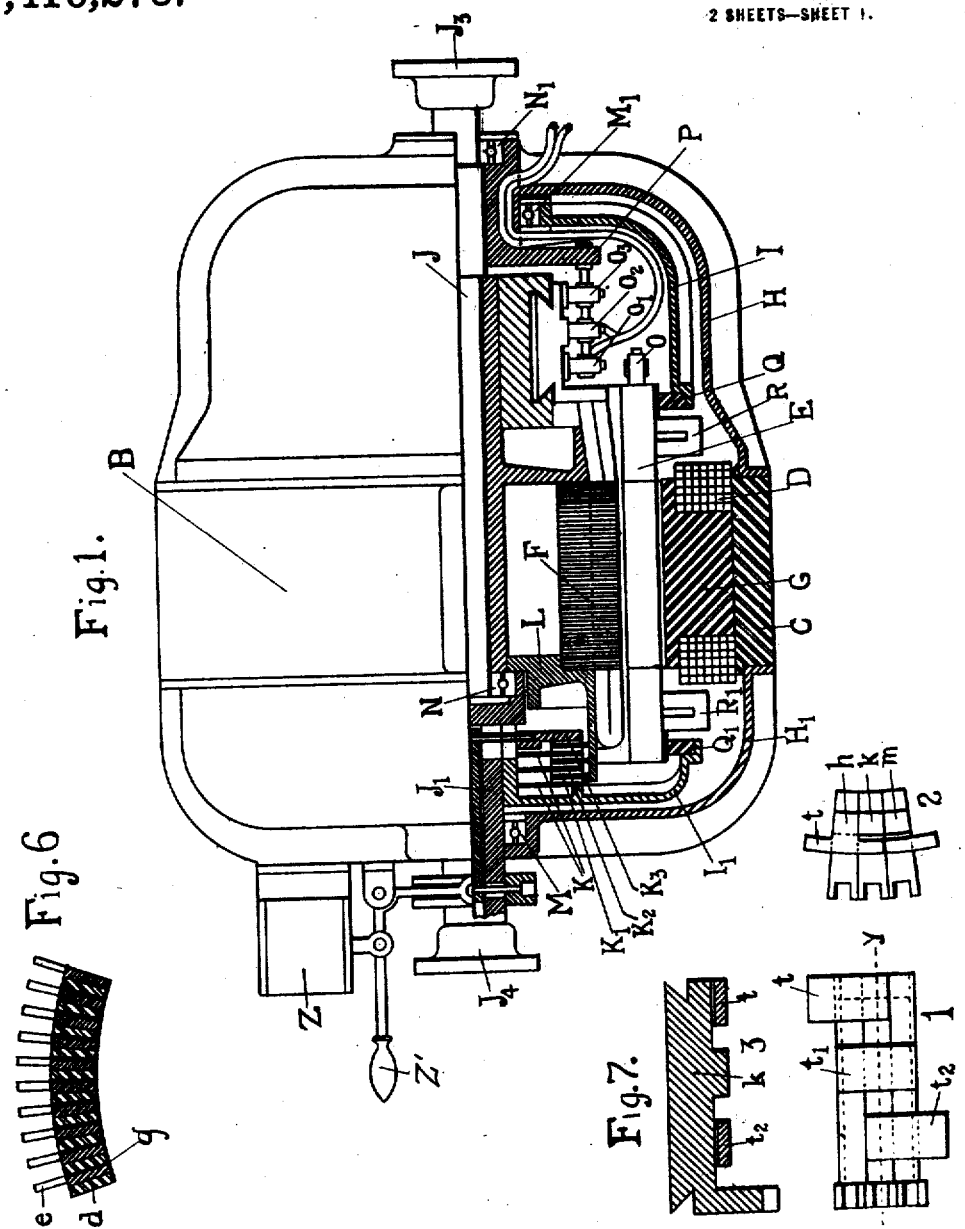

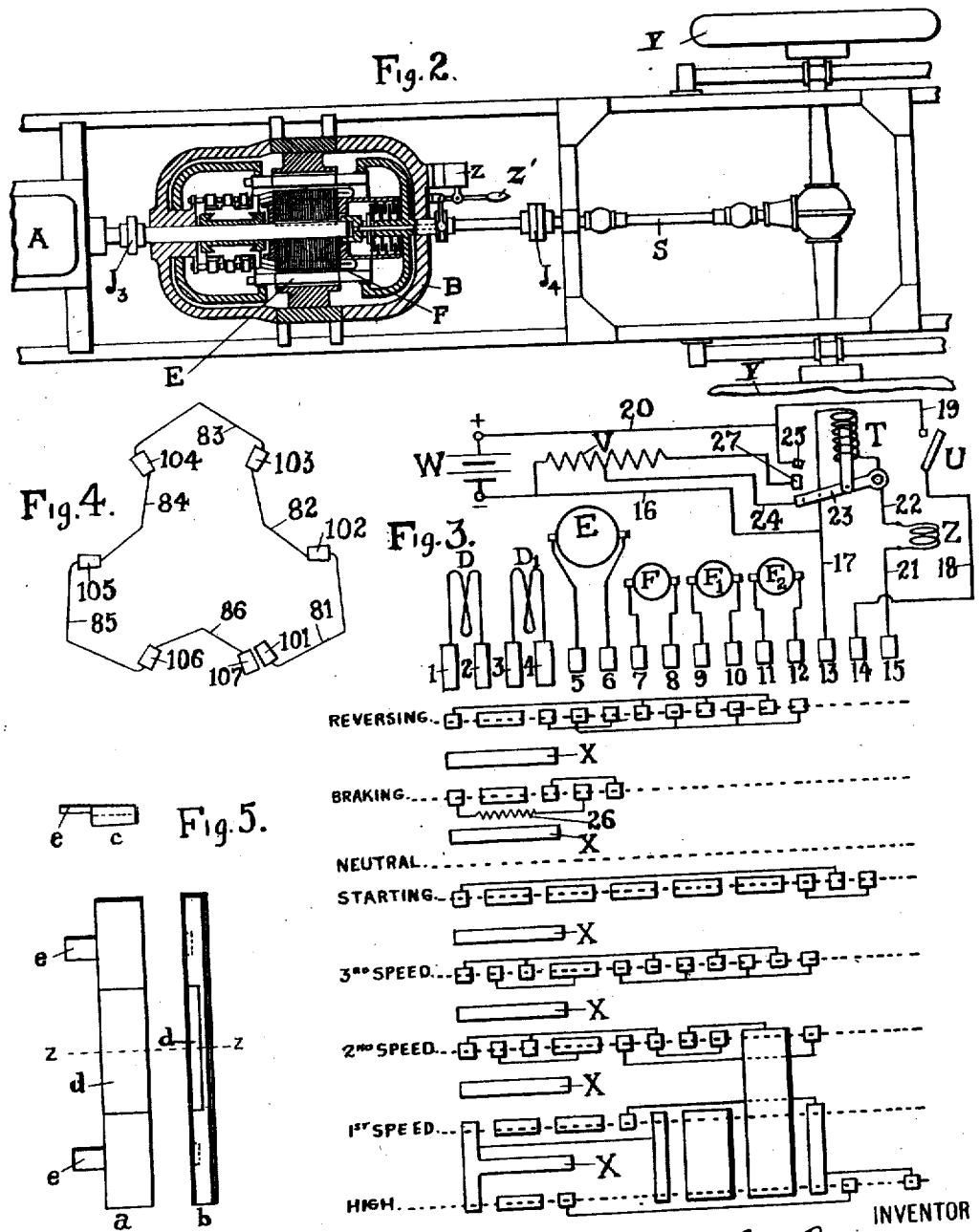

ETHELBERT M. FRASER, OF YONKERS, NEW YORK.

POWER TRANSMISSION AND CONTROL.

1,416,273.  Specification of Letters Patent.  Patented May 16, 1922.

Application filed March 16, 1916. Serial No. 84,509.

*To all whom it may concern:*

Be it known that I, ETHELBERT M. FRASER, a citizen of the Dominion of Canada, residing at Yonkers, county of Westchester, and State of New York, have invented new and useful Improvements in Power Transmission and Control, of which the following is a specification.

My invention relates to an electric power transmission and control by which mechanical power is transformed into electric power and the electric power is transformed back to mechanical power, the transmission apparatus being so arranged that the speed and torque of the prime mover or power-supplying means can be varied through wide limits when transmitted through the transmission apparatus to the driven part.

As shown and described herein my improved electric power transmission comprises an electric machine made up of three elements which coact electrically and magnetically. Two of these elements rotate and the third element is stationary. The two rotors are concentric and rotatable either in the same direction or in directions opposite to each other. One of the rotors includes an armature with its windings and commutator; the other rotor includes a second winding with its commutator; and the stationary element includes a field magnet.

The machine is further constructed and the parts so arranged that the rotors are capable of exerting a reactive electro-magnetic effect on each other and also on the stationary field magnet.

In the preferred form of my improved power transmission the two rotors revolve about the same axis and are concentric. One of the rotors is driven by any form of engine or motor capable of exerting driving effort and doing work, the other rotor being connected to any power-absorbing apparatus which it is desired to drive. The field magnet structure encircles the two rotors and end bells secured to said field structure serve to carry the bearings on which revolve the rotors. The rotor commonly designated as an armature is mechanically coupled to the power-supplying means or prime mover, and the other rotor called a second winding is mechanically connected to the driven part. Suitable means may be employed whereby the two rotors can be coupled or mechanically connected together and rotated positively in unison.

Some of the objects of my invention are (1) to provide an electric power transmission whereby the torque of the prime mover when transmitted through the transmission apparatus to a driven part can be varied, the torque being greatest on the driven part when the driven part is running at the slowest speed; (2) to provide an electric power transmission whereby the torque on the driven part will increase in direct ratio as the speed of the driven part is reduced; (3) to provide an electric power transmission whereby the direction of rotation of the driven part can be changed electrically and without the use of mechanical gearing; (4) to provide an electric transmission with a minimum number of rotating elements; (5) to provide an electric power transmission in which the magnetic field distortion, due to armature reaction, is neutralized; (6) to provide an electric power transmission in which the magnetic reactions of the two rotors neutralize each other; and (7) to provide an electric power transmission in which the ampere capacity of the generator element can be easily changed during operation.

Other objects of my invention will appear from the drawings and the detailed description to follow.

An electric power transmission and control embodying my invention is illustrated in the accompanying drawings, forming a part of this specification, in which Figure 1 is a view partly in section illustrating my power transmission apparatus.

Figure 2 is a view illustrating diagrammatically the application of my power transmission apparatus to an automobile, showing the arrangement of the prime mover or power-supplying means, the transmission apparatus and the driven part together with the framework for holding the different parts in alignment.

Figure 3 is wiring diagram.

Figure 4 is a diagram of part of the second winding.

Figure 5 illustrates diagrammatically three views of one of the conductors of the rotatable second winding.

Figure 6 illustrates a portion of the second winding shown in section.

Figure 7 illustrates three views of the commutator used in connection with the generator armature.

As shown in Figure 1 my improved electric power transmission comprises an electric generator-motor B which comprises an outer field magnet structure consisting of magnet yoke C, magnet cores and poles G and field coils D, an armature F with its windings and core, and a rotatable second winding E interposed between said field structure and said armature.

Secured to the field structure are the end bells H, $H_1$.

Secured to the rotatable winding E are the end bells of spiders, I, $I_1$, the spider $I_1$ being secured to and driving the shaft $J_1$.

The armature F is secured to and is driven by the shaft J. $J_3$, $J_4$, are couplings secured, respectively, to the shafts J and $J_1$, and are for the purpose of connecting the rotatable elements of my electric power transmission to the prime mover and the driven part.

Any well-known form of clutch may be used to lock the armature F and the rotatable winding E together so as to cause them to rotate in unison. The clutch as shown comprises metal discs K which are driven by the shaft $J_1$ and metal discs $K_1$ driven by the armature spider L. The metal discs $K_1$ have secured to their rubbing surfaces any well-known frictional material $K_2$.

The rotatable winding E, with spiders I, $I_1$, and connected shaft $J_1$, are supported by suitable bearings M, $M_1$, which are supported in turn by the end bells H, $H_1$.

The armature F is supported by suitable bearings N, $N_1$. The bearing N is supported by the enlarged end of the shaft $J_1$, and the bearing $N_1$ is supported by the end bell H.

The brushes supplying current to the winding E are shown at O and are supported by a brush holder, not shown, secured to the projection P on the end bell H. The brushes $O_1$, $O_2$, $O_3$ take current from the armature F and are supported by the projection P of the end bell H.

As shown in Figure 2, the armature F of the generator-motor B is coupled to the prime mover A by the coupling $J_3$. The rotatable winding E is coupled to and positively drives the automobile propeller shaft S by the coupling $J_4$. The propeller shaft S is connected to and drives the wheels Y, Y through shafting and gears arranged in the well-known way.

In Figure 3 the rotatable second winding is indicated at E. The main armature windings are indicated at F, $F_1$, $F_2$, and the field coils at D, $D_1$. W is any form of storage or secondary battery. T is a relay switch operated at a set voltage and cuts the storage battery W in and out of the armature circuit. U is an ordinary single pole switch. The armature windings, field coils, etc., are connected together in the proper manner through contacts arranged in a well-known manner in a device known as a drum controller. In the figure the contacts as arranged on the drum are shown in a flat or developed view so the circuits can be readily traced.

The different electrical elements comprising the transmission are electrically connected to contact brushes 1, 2, 3, 4, 5, 6, 7, 8, 9, 10, 11, 12, 13, 14, 15. When the drum (shown in the figure as developed or flat) is rotated the aforementioned contact brushes are connected and interconnected so that the current flows through the circuits in the proper manner.

Figure 4 illustrates the manner in which the conductors in one portion of the winding E may be connected in a generator-motor having six poles, 101, 102, 103, 104, 105, 106, 107 representing some of the conductors in said winding E. As an illustration, the current comes from the brush to conductor 101, thence through the back cross connection 81 to conductor 102, through conductor 102 to front cross connection 82 to conductor 103, thence through conductor 103 to back cross connection 83 to conductor 104, through conductor 104 to front cross connection 84 to conductor 105, through conductor 105 to back cross connection 85 to conductor 106, thence by front cross connection 86 to conductor 107. This completes one circuit around the winding E. The winding is commonly known as a six pole wave or two circuit winding.

In Figure 5 are shown three views of one of the conductors making up the rotatable winding E. $a$ is a side view of the conductor, which is made of copper or other highly conducting metal. $b$ is a top view of the conductor and $c$ is an end view. Set into the side of the conductor is a strip of soft iron $d$. This strip of soft iron is of a length equal to the length of the pole face, and it is made part of the conductor to lower in a radial direction the reluctance of the magnetic circuit through the rotatable winding E. $e$, $e$ are lugs to which the end, or cross connectors are connected to make up the proper armature circuits.

Figure 6 represents a section taken through a line Z, Z of Figure 5, showing ten such conductors as arranged in the armature winding E, in which $d$ is the soft iron portion, $e$ the connecting lug, and $g$ the insulation separating each conductor.

Figure 7 represents three views of three commutator bars, $h$, $k$ and $m$, arranged as they would be in the commutator of the generator-motor B, in which view 1 is a plan view, view 2 is an end view and view 3 is a section taken through line $y$—$y$ in view 1. Each commutator bar has a T-shaped projection; the projection on bar $h$ is shown at t, the projection on bar k at t₁, and the projection on bar m at t₂. The T-shaped projection, as well as the commutator bar to which it is connected, is insulated from all the other bars.

When my improved transmission is used in connection with an automobile it can also be used to start the engine and also furnish current to charge the battery and for lighting and other purposes for which electric current can be used.

In order to start the engine it is necessary to provide some source of electric power, such as any well-known form of storage or secondary battery; suitable switches are also provided to cause the current to flow in the proper manner.

In order to start the engine the switch U is closed and the drum of the drum controller is rotated until the contact brushes are in line and in contact with the metal strip, through which the dotted line, indicated by "Starting," passes. In this position, the current from the battery flows from the + pole along wire 20 to wire 19 through the switch U to wire 18 to contact brush 14. The cross-connected metal strips carry the current to contact brush 12, thence through armature winding F₂ to contact brush 11, by metal strip to contact brush 10, thence through armature winding F₁ to contact brush 9 and metal strip to contact brush 8, through armature winding F to contact brush 7 through metal strip to contact brush 6, thence through the winding E to contact brush 5, through metal strip to contact brush 4, thence through field coil D₁ to contact brush 3 to contact brush 2 through metal strip, from contact brush 2 through field coil D to contact brush 1, and thence by cross-connected brass strips to wire 17 and wire 16 back to − battery.

When it is desired to operate the propeller shaft at substantially one third the speed and with substantially three times the torque of the engine, the drum is rotated until the contact brushes are in line with the contacts through which the dotted line, designated as "3rd speed," passes. In this position the windings F, F₁, F₂ become generator windings and the winding E becomes a motor winding. When operating the transmission in the 3rd speed position the generator armature windings F, F₁, F₂ are in multiple with each other and in series with the field coils D, D₁, which are also in multiple with each other and in series with the motor winding E. Contact brushes 8, 10, 12 are connected together by cross-connected metal strips and contact brushes 7, 9, 11 are connected together by cross-connected metal strips. Contact brushes 2, 4 are connected together by cross-connected metal strips and contact brushes 1, 3 are connected together by cross-connected metal strips.

The current then flows from contact brushes 7, 9, 11 through armature windings F, F₁, F₂ to contact brushes 8, 10, 12 thence through cross-connected metal strips to contact brush 6 through winding E to contact brush 5, thence to contact brushes 2, 4 through field coils D, D₁ to contact brushes 1, 3 thence back to contact brushes 7, 9, 11.

When it is desired to operate the propeller shaft at substantially two-thirds speed and substantially one and one-half times the torque of the engine the drum is rotated until the contact brushes are in line with the contacts through which the dotted line, designated as "2nd speed," passes. In this position the generator armature windings F, F₁ and F₂ are connected in series parallel and are in series with the field coils, which are in parallel with each other, and in series with the motor winding E. The generator armature windings F, F₁ are in multiple with each other and in series with generator armature winding F₂. Tracing the direction of flow of current in the second speed position and starting at contact brush 11 the current flows through armature winding F₂ to contact brush 12, thence through cross connected metal strips to contact brush 6 then through motor winding E to contact brush 5 to contact brushes 2, 4 through field coils D, D₁ to contact brushes 1, 3 then by cross connected metal strips to contact brushes 7, 9 through armature windings F, F₁ to contact brushes 8, 10 and back to contact brush 11 through cross connected metal strips.

When it is desired to operate the propeller shaft at substantially the same speed as the engine and with substantially the same torque, the drum is rotated until the contact brushes are in line with the contacts through which the dotted line, designated as "1st speed," passes. In this position the generator armature windings F, F₁ and F₂ are in series with each other, in series with the field coils which are in series with each other, and also in series with the motor winding E.

Tracing the direction of the flow of current in the first speed position and starting at contact brush 7, the current flows through armature winding F to contact brush 8 to contact brush 9, through armature winding F₁, to contact brush 10 to contact brush 11, thence through armature winding F₂ to contact brush 12, through cross-connected metal strips to contact brush 6, through winding E to contact brush 5 to contact brush 4, through field coil D₁ to contact brush 3 to contact brush 2, through field coil D to contact brush 1 and back to contact brush 7 by cross-connected metal strips.

When it is desired to operate the propeller shaft in "high" the clutch is locked and the engine drives direct and not through the electric and magnetic reactions in the transmission apparatus. In the "high" position the transmission apparatus acts as a generator to charge the battery and also furnishes current for the electro-magnet which locks the clutch. In order to operate in "high" the drum is rotated until the contact brushes are in line with the contacts through which the dotted line, designated as "high," passes. In this position generator armature windings F, $F_1$, $F_2$ are in series with the field coils D, $D_1$ and charge the battery W. Tracing the flow of current in the high position and starting at contact brush 7 the current flows through armature winding F to contact brush 8 to contact brush 9, through armature winding $F_1$ to contact brush 10 to contact brush 11, through armature winding $F_2$ to contact brush 12, thence through cross-connected metal strips to contact brush 15. From contact brush 15 the current flows through wire 21 to clutch coil Z, through wire 22 to switch arm 23 (the switch arm in the high position should be in contact with contact 25, the arm being shown in the starting position) to contact 25 and to + battery by wire 20. From — battery the current flows along wire 16 to wire 17 to contact brush 13, thence by cross-connected metal strips to contact brush 4, through field coil $D_1$ to contact brush 3 to contact brush 2, through field coil D to contact brush 1 and back to contact brush 7 by cross-connected metal strips.

When it is desired to operate the transmission as a brake the drum is rotated until the contact brushes are in line with the contacts through which the dotted line, designated as "Braking," passes. In this position the winding E acts as a generator winding and is partially short-circuited through the field coils and a resistance.

Tracing the flow of current in the braking position and starting at the contact brush 5 the current flows through the winding E to contact brush 6, through cross-connected metal strips to contact brush 4, through field coil $D_1$ to contact brush 3 to contact brush 2, through field coil D to contact brush 1, thence through resistance 26 to contact brush 5.

When it is desired to operate the transmission so as to revolve the propeller shaft in the opposite direction to that in which the engine shaft is running, the drum is rotated until the contact brushes are in line with the contacts through which the dotted line, designated as "Reversing," passes. In this position the generator armature windings F, $F_1$, $F_2$ are in multiple with each other and in series with motor winding E and connected in such a way that winding E runs in the reverse direction to the armature driven by the engine.

Tracing the flow of current in the reverse position of the controller and starting at contact brushes 7, 9, 11 the current flows through armature windings F, $F_1$, $F_2$ to contact brushes 8, 10, 12, thence through cross connected metal strips to contact brush 5, and through the winding E to contact brush 6, to contact brush 4, through field coil $D_1$ to contact brush 3, to contact brush 2, through field coil D to contact brush 1 and back to contact brushes 7, 9, 11 through cross-connected metal strips.

When the drum is rotated until the contact brushes are in line with the dotted line designated "Neutral" all armature and field circuits are open.

When the drum is rotated to the high position and it is desired to charge the battery, in order to energize the field magnets there must be a closed circuit as the field coils are in series with the armature. In order to cause a current to flow I insert a resistance V across one armature lead and one field connection, thereby completing the armature and field circuits and energizing the field. The direction of the flow of current thus is: from contact brush 7 through armature windings F, $F_1$, $F_2$ to contact brush 15, to wire 21, through coil Z by wire 22 to switch arm 23, to wire 24, through the left half of resistance V, to wire 16, to wire 17 to contact brush 13 and back to contact brush 7 through field coils D, $D_1$.

When current flowing through the resistance V causes a greater drop in voltage than is required to charge the battery the coil on the magnet T, which is shunted across the resistance V, is energized and raises the switch arm 23 so that it is in contact with the contact button 25 and the current which was flowing through resistance V is diverted through the battery in such a way as to charge it. The coil is so arranged that when the voltage supplied by the transmission mechanism falls below that of the battery the switch arm 23 drops and again cuts in the resistance V. The contact 27 and the right half of resistance V are for the purpose of maintaining the circuit when the switch arm 23 is moving up or down and also prevents the arm 23 from short-circuiting the battery when it is moving over the contact buttons.

The rotatable winding E is made up of compound conductors as illustrated in Figure 5. These conductors are held securely together forming a cylinder by the steel rings Q, $Q_1$ and the conductors are properly interconnected by the cross-connections indicated in Figure 1 at R and $R_1$. The steel rings Q, $Q_1$ are insulated from the conductors by any suitable insulating material. The ends of the conductors form the commutator for the winding.

The armature F, which is constructed in a manner similar to any well-known form of direct current armature, is supplied with three separate armature windings. One armature winding is connected to all the commutator bars whose T-shaped projections are in circumferential line with the part marked $t_2$ in Figure 7. Another armature winding is connected to all the commutator bars whose $t$-shaped projections are in a circumferential line with the part marked $t_1$ in Figure 7; and the other armature winding is connected to all the commutator bars whose T-shaped projections are in a circumferential line with the part marked $t$ in Figure 7. Such a commutator construction forms three separate and distinct commutators in such a manner that one core will hold all the bars and the connecting lugs for the three commutators are in a convenient position to be connected to the armature coils.

The method of operation is as follows:

The power-supplying means or engine A is started and the connected armature F is rotated at engine speed. The drum controller is rotated until it is in the 3rd speed position thereby completing the proper transmission circuits in the proper manner. When all the armature windings on armature F are in series, in the preferred arrangement of my transmission, there are the same number of turns of wire as there are composing the second winding E; with the same amperes flowing in the armature and in the winding E the ampere turns of each are the same. In the 3rd speed position, for the reason that the three armature windings are in multiple, if there was the same current flowing in the windings of F and E there would only be one-third the ampere turns on armature F that there would be in the winding E.

Armature F and winding E are both supplied with flux by the same field magnet structure and while the field flux may vary yet the flux supplied to armature F and winding E is always substantially the same at any given time.

As stated hereinabove the armature F is rotated at engine speed and acts as a generator. The winding E is mechanically connected to the propeller shaft J' and acts as a motor. When the armature windings on F are in multiple with each other and in series with the field coils D, D₁ which are in multiple with each other, the winding E, being in series with both the field coils and generator armature windings, will rotate at substantially one-third the number of revolutions that generator armature F is rotating and the torque exerted by motor winding E will be substantially three times the torque that is supplied to the generator armature F by the engine.

In a similar manner when the drum controller is rotated to the 2nd speed position there are one and one-half times the ampere turns in the winding E as there are on armature F, thereby causing winding E to rotate at substantially two-thirds the speed of generator armature F and with a torque substantially one and one-half times the engine torque.

In the 1st speed position the armature windings and the winding E have equal ampere turns and the propeller shaft is driven at substantially the same speed and at substantially the same torque as supplied by the engine A.

In the high position the motor winding E is cut out of circuit and the friction clutch transmits the power direct to the propeller shaft. The generator armature is so arranged that it will charge the battery.

When it is desired to apply a braking effect the motor winding E is partially short-circuited through the resistance 26.

When it is desired to reverse the direction of rotation of the propeller shaft and cause the vehicle to back up the drum controller is rotated until the contacts are in the reversing position; the connections are then made so that the motor winding E revolves in the opposite direction to that in which the generator armature F revolves.

When it is desired to operate the vehicle without the interposition of my electric power transmission the friction clutch can be operated by hand through the lever and handle Z'.

During the normal operation of the device (i. e., during the varying speeds ahead) the flow of current through the conductors of armature F and winding E will always be in opposite directions, and the armature F and winding E will rotate in the same direction.

When the device is operating in the reverse direction (i. e., the direction of rotation of the propeller shaft is reversed) the flow of current through the conductors of armature F and winding E will be in the same direction, and the armature F and winding E will rotate in opposite directions.

At all times, during the operation of the device, the axes of commutation will coincide.

When current flows in the conductors of each armature winding, either in the same direction or in opposite directions, each armature winding exerts an electro-magnetic effect on the field, and the conductors of each armature winding being in close proximity to each other will also exert an electro-magnetic effect on each other.

When the current is flowing in opposite directions in the conductors of each armature winding, the magnetic reactions of both sets of windings on the common field are either wholly or partially neutralized and the tendency to spark at the brushes is overcome.

With the same number of ampere turns in both sets of windings and the current flow in opposite directions, as stated above, there are no electro-magnetic reactions on the field. When the ampere turns vary in the two sets of windings the reactions vary in direct ratio to the number of turns in both sets of windings.

In order to overcome the destructive arcings in the drum controller when the circuits are broken I short-circuit the field coils, kill the field and reduce the current to zero before any circuits are broken. In Figure 3 a metal contact strip, illustrated at $X_5$ is placed on the drum between each row of cross-connected metal strips. Contact brushes 1, 2, 3, 4 are made longer than the other contact brushes and when the drum is rotated the strips X will make contact with the contact brushes 1, 2, 3, 4 and short-circuit the field coils $D$, $D_1$ thereby killing the field and reducing the voltage and current to zero before any of the other circuits are broken.

When my transmission is operated in the high position no current (other than that required to charge the battery and furnish current for the lights) flows in the armature windings, the second winding or field coils, the battery charging current then flows through the magnet coil Z energizing the magnet core and operating the lever Z' in such a manner that the friction clutch will automatically operate to clutch the armature and the second winding together.

It is apparent that the field flux is a fixed unvarying flux; it is "fixed" in that the flux is non-rotating, and it is "unvarying" in that the flux passing through the armature F and the winding E is always substantially the same at any given time.

While in the preferred embodiment of my invention, as herein shown and described, the field structure is exterior to and encircles the armatures and the second winding, yet the field structure and the armature may be inter-changed so that the armature will be exterior to and encircle the field structure and the second winding. In such modified form the armature will be connected to and driven by the prime mover, the second winding connected to the driven part, and the field structure will be stationary, as in the form herein shown and described.

While I have herein shown and particularly described the preferred embodiment of my invention, it is obvious that changes in the arrangement, construction and combination of the several parts of my device can be made without departing from the nature and principle of my invention, and I do not therefore wish to be limited to the precise arrangement, construction and combination shown and described herein.

What I claim is:

1. An electric machine comprising an armature provided with a winding and a core, a field structure including a set of field magnets, and a second winding interposed between said armature and said field structure and provided with means for reducing the reluctance between the armature core and the field magnets while maintaining a relatively high reluctance between adjacent field magnets and also provided with a commutator, the core of said armature being magnetically common to said armature and said second winding.

2. An electric machine comprising a rotatable armature provided with a winding and a core, a stationary field structure, and an independently rotatable second winding interposed between said armature and said field structure and provided with a commutator, the core of said armature being magnetically common to said armature and said second winding and carrying substantially all of the flux supplied by the field.

3. An electric machine comprising a field structure including a set of field magnets, an armature provided with a winding and a core, and a second winding interposed between said field magnets and said armature, said second winding having means for reducing the reluctance between the field magnets and armature core while maintaining a relatively high reluctance from field magnet to field magnet.

4. An electric machine comprising a magnetic field structure, an armature provided with a winding and a core and a second winding interposed between said armature and said field structure, said second winding being provided with insulated spaced magnetic conductors for causing the magnetic flux to flow from said field structure to the core of the armature.

5. An electric machine comprising a field structure, a rotatable armature provided with a winding and a core, and an independently rotatable second winding intermediate said field structure and said armature, said second winding being provided with means for causing substantially all of the magnetic flux to flow from the field magnets to the armature core.

6. An electric machine comprising a stationary field structure, a rotatable armature provided with a winding, a core and a commutator, and an independently rotatable second winding having a commutator, said second winding being concentric with the armature and intermediate said field structure and said armature, but having no core intermediate said armature and said field structure.

7. An electric machine comprising a field structure, a rotatable armature provided with a winding, and an independently rotatable second winding concentric with the armature and intermediate said field structure and armature, the field structure, armature and second winding being so constructed and arranged that substantially all of the magnetic lines of force will pass through the second winding at substantially right angles to the direction of rotation.

8. An electric machine comprising in combination a field structure; a rotatable armature provided with a winding, a core and a commutator; a rotatable second winding interposed between said field structure and said armature, said second winding having a commutator but no core; and two independently rotatable shafts; the armature being secured to one of said shafts and the rotatable second winding being secured to the other of said shafts.

9. An electric machine comprising a rotatable armature provided with a winding, a stationary field structure, and a rotatable second winding interposed between said armature and said field structure and having a commutator, said armature having means for varying the rotative speed of said second winding.

10. In a power transmission mechanism, the combination with an electric machine comprising a rotatable armature provided with a winding, a stationary field structure, and a rotatable second winding interposed between said armature and said field structure, said armature having means for varying the speed of rotation of said second winding, of means for varying the direction of a rotation of said second winding.

11. The combination of an engine, a driven part, and an electric machine interposed between said engine and said driven part, said machine comprising two concentric rotatable armature windings, only one of which is secured to a core, and a stationary field structure, one armature winding being connected to and driven by said engine and the other armature winding being connected to and operating on said driven part.

12. In a power transmission mechanism, an electric machine comprising a field structure, an armature provided with a winding, a core and a commutator, and a second winding having a commutator and provided with a series of insulated spaced magnetic conductors, said second winding being concentric with the armature and intermediate said armature and said field structure, said armature and second winding being rotatable either in the same direction or in directions the reverse of each other.

13. An electric machine comprising a field structure, an armature provided with a winding and a core, and a second winding concentric therewith and intermediate said armature and said field structure and having a commutaor, said field structure, armature, and second winding being so constructed and arranged that substantially all the flux flowing from the field magnets to the armature core will pass through both windings.

14. An electric machine comprising a field structure, an armature provided with a winding and a core, and a second winding concentric therewith and intermediate said armature and said field structure and having a commutator, said field structure, armature and second winding being so constructed and arranged that the flux passing through both windings will be substantially the same at any given time.

15. An electric machine comprising a stationary field structure including a field magnet, a rotatable armature provided with a winding and a core, and a rotatable second winding intermediate said field structure and said armature and having a commutator but no core secured thereto, the field structure, armature and second winding being so constructed and arranged that the armature and second winding will exert a reactive electro-magnetic effect on each other and also on the field magnet.

16. The combination of an engine, a rotatable armature with its windings connected thereto and driven thereby, a stationary field structure having coils, a rotatable second winding interposed between said armature and said field structure, a driven part connected to said second winding, and means connecting the armature windings in series with each other, in series with the field coils, and in series with the second winding, and also connecting the field coils in series with each other, so that the driven part will operate at substantially the same speed as the engine and with substantially the same torque.

17. The combination of an engine, a rotatable armature with its windings connected thereto and driven thereby, a stationary field structure having coils, a rotatable second winding interposed between said armature and said field structure, a driven part connected to said second winding, and means connecting the armature windings in multiple with each other and in series with the field coils, and in series with the second winding, and also connecting the field coils in multiple with each other, so that the driven part will operate at substantially one-third the speed of the engine and with substantially three times the torque of the engine.

18. The combination of an engine, a rotatable armature with its windings connected thereto and driven thereby, a stationary field structure, a rotatable second winding interposed between said armature and said field structure, a driven part connected to said second winding, and means connecting the armature windings in series parallel, in series with the field coils, and in series with the second winding, and also connecting the field coils in parallel with each other, so that the driven part will operate at substantially two-thirds the speed and with substantially one and one-half times the torque of the engine.

19. The combination with an electric machine comprising a stationary field structure, a rotatable armature provided with a core and a winding, and a rotatable second winding concentric with said armature and intermediate said field structure and said armature, said core being the only armature core magnetically common to said armature and said second winding, of means for varying the current capacity of said armature.

20. The combination of an engine, a stationary field structure having coils, a rotatable armature provided with windings mechanically connected to the engine and driven thereby, a rotatable second winding intermediate said field structure and said armature, a driven part mechanically connected to said second winding and driven thereby, a battery, and means for connecting said battery, said armature windings, said second winding and field coils in series for starting said engine.

21. The combination of an engine, a rotatable armature provided with windings mechanically connected to said engine and driven thereby, a stationary field structure having coils, a rotatable second winding interposed between said armature and said field structure, a driven part mechanically connected to said second winding, a battery, electrically-operated means for locking said armature and said second winding together, and means for connecting said armature windings in series with said battery and in series with said field-coils for charging said battery.

22. The combination of an engine, a rotatable armature provided with windings mechanically connected thereto and driven thereby, a stationary field structure having coils, a rotatable second winding interposed between said armature and said field structure, a driven part mechanically connected to said second winding, and means for connecting said armature windings in multiple with each other and in series with said second winding, and in series with said field coils for causing said second winding to rotate in a direction opposite to the rotation of said armature.

23. In a power transmission and control, the combination with an electric machine comprising only one field structure, only one rotatable armature provided with a winding and a core, and only one rotatable second winding concentric with said armature and intermediate said armature and said field structure, of a source of current supply in circuit with said armature and said field, and means for automatically inserting and cutting resistance in and out of the circuit of said armature.

24. The combination of an engine, a driven part, an electric machine comprising only one set of field magnets and coils, only two independently rotatable concentric armature windings, and only one core magnetically common to both armature windings, one of said armature windings being connected to and driven by said engine and the other armature winding being connected to and operating said driven part, and means for mechanically coupling together said two armature windings.

25. In combination an engine, a rotatable armature provided with windings, mechanically connected thereto and driven thereby, a stationary field structure having coils, a rotatable second winding interposed between said armature and said field structure, a driven part mechanically connected to said second winding, a resistance adapted to be inserted in the field circuits, and means for partially short-circuiting said second winding through said field coils and said resistance.

26. In a power transmission mechanism, an electric machine comprising a rotatable armature provided with a winding, a rotatable second winding concentric therewith, and a stationary field structure, said rotatable second winding having conductors of high electric and magnetic conductivity.

27. An electric machine comprising a field structure, two independently rotatable concentric armature windings, and only one armature core, one of said armature windings comprising a plurality of separate windings.

28. An electric machine comprising one field structure, two independently rotatable concentric armature windings, and only one armature core, one of said armature windings comprising a single winding, and the other armature winding comprising a plurality of separate windings.

29. An electric machine comprising a field structure, two concentric armature windings, a plurality of commutators, and only one armature core, one of said armature windings comprising a plurality of separate windings each of which is connected to its respective commutator.

30. An electric machine comprising one field structure, two concentric armature windings, a plurality of commutators, and only one armature core, one of said armature windings comprising a single winding and the other armature winding comprising a plurality of separate windings, each of all of the windings being connected to its respective commutator.

31. In combination, a prime mover, means for creating a fixed magnetic flux, a group of generator inductors driven by said prime mover, a group of motor inductors interposed between said flux means and said generator inductors and having means for reducing the reluctance radially while maintaining a relatively high reluctance circumferentially, a driven part connected to and driven by said group of motor inductors, and means for grouping said generator inductors to vary their current capacity.

32. The method of transmitting power from a prime mover to a driven part, consisting in driving a group of generator inductors by said prime mover to cut a fixed magnetic flux whereby the kinetic energy produced by said prime mover will be absorbed and transformed into electrical energy, causing a group of motor inductors to cut said fixed magnetic flux in a field located between the source of said flux and said generator inductors whereby said electric energy will be absorbed and transformed into kinetic energy, transmitting the last-mentioned kinetic energy to said driven part, and controlling the torque ratio between the prime mover and the driven part by varying the ampere turns in one group of inductors without varying the proportion of magnetic flux passing through each group of inductors.

33. The method of transmitting power from a prime mover to a driven part, which consists in establishing a fixed magnetic flux, rotating a group of inductors in said flux to generate current, transmitting this current to another group of inductors independently rotatable in said flux, and establishing and maintaining specific predetermined definite controlled ratios between the torques of said groups of inductors under all conditions of load and speed.

34. An electric machine comprising a stationary field structure adapted to produce a fixed magnetic flux, two independently rotatable armature windings concentric with said field structure and arranged to cut said flux, one of said armature windings comprising a plurality of windings, and means for varying the ratios between the torques of said armature windings, while rotating in said flux, each of said ratios being predetermined, definite and constant under all conditions of load and speed.

35. In an electric power transmission apparatus, a driving armature provided with a winding, a driven armature provided with a winding and surrounding the driving armature and in inductive relation therewith, a stationary field element surrounding the driven armature, the windings of the armatures and field being electrically connected, and means for reversing the direction of current in the driving armature.

This specification signed and witnessed this 15th day of March, A. D., 1916.

ETHELBERT M. FRASER.

Signed in the presence of—
G. McGrann,
M. F. Keating.